(12) United States Patent
Andersson

(10) Patent No.: US 10,738,901 B1
(45) Date of Patent: Aug. 11, 2020

(54) CHECK VALVE

(71) Applicant: Flomatic Corporation, Glens Falls, NY (US)

(72) Inventor: Allan Bo Andersson, Cambridge, NY (US)

(73) Assignee: Flotmatic Corporation, Glen Falls, NY (US)

( * ) Notice: Subject to any disclaimer, the term of this patent is extended or adjusted under 35 U.S.C. 154(b) by 0 days.

(21) Appl. No.: 16/275,924

(22) Filed: Feb. 14, 2019

(51) Int. Cl.
  F16K 15/02 (2006.01)
  F16K 15/06 (2006.01)
(52) U.S. Cl.
  CPC ......... F16K 15/06 (2013.01); *Y10T 137/7933* (2015.04)
(58) Field of Classification Search
  CPC ... F16K 15/06; F16K 15/063; Y10T 137/7399
  USPC ............................................. 137/535, 543.13
  See application file for complete search history.

(56) References Cited

U.S. PATENT DOCUMENTS

| | | | |
|---|---|---|---|
| 2,594,641 A * | 4/1952 | Griffith | ................. F16K 15/063 137/543 |
| 9,032,992 B2 | 5/2015 | Andersson | |
| 9,163,737 B2 | 10/2015 | Andersson | |

* cited by examiner

*Primary Examiner* — P. Macade Nichols
(74) *Attorney, Agent, or Firm* — Heslin Rothenberg Farley & Mesiti P.C.

(57) ABSTRACT

A check valve is provided for use with, for example, variable frequency drives and other applications without the valve becoming misaligned. In one aspect, the valve includes a housing with an inner surface and a passage. A flange within the housing divides the housing into upstream and downstream portions, and extends around the inner surface, defining a valve seat and a valve aperture. A poppet is positioned in the downstream portion. The poppet includes a valve head and a stem extending from the valve head and into the downstream portion, and not through the valve aperture. The valve head is resiliently biased in the closed position against the valve seat to inhibit fluid flow in a first direction. A guide disposed within the housing receives the stem of the poppet valve as the poppet valve moves between an open position and a closed position. The guide is secured into place by a spring clip. The spring clip is uniquely configured to provide multiple functions to, for example, engage with the inner surface of the housing and an outer surface of the guide to securely retain guide and poppet within passage during operation of valve and allow the guide and the poppet to float during variable flow conditions.

13 Claims, 18 Drawing Sheets

CHECK VALVE

TECHNICAL FIELD

This invention relates generally to the field of valves, and more specifically, to valves capable of tolerating a variable flow of fluid.

BACKGROUND OF THE INVENTION

Check valves are designed to permit the flow of fluid in one direction while preventing the fluid from flowing in the reverse direction. Conventional check valves utilize a single poppet valve within a body which controls the flow of fluid therethrough. However, conventional poppet valves are likely to become lodged in the interior seat provided by an annular flange within the valve body. When this happens, it is almost impossible to dislodge the poppet valve without dismantling the check valve or utilizing a new fitting. Moreover, conventional valves are difficult to assemble and may include many parts and fasteners. It may also be awkward to assemble and/or repair valves, as different parts can be located on opposite sides of a valve seat or flange formed within the valves.

SUMMARY OF THE INVENTION

The shortcomings of the prior art may be alleviated by using a valve in accordance with one or more principles of the present invention. The valve of the present invention may be used in any type of hydraulic or other fluid flow lines such as, for example, water, fuel, or gas lines, wells, cisterns, submersible pump applications, pumping outfits or the like. Additionally, other uses may be made of the invention that fall within the scope of the claimed invention but which are not specifically described below.

In one aspect of the invention, there is provided a check valve. The check valve includes a housing, a flange within the housing, a poppet valve, a guide and a retainer ring. The housing includes an inner periphery surface defining a passage therethrough between an inlet port and an outlet port. The flange within the housing divides the passage between the inlet port and outlet port into an upstream portion and a downstream portion. The flange extends circumferentially around the inner periphery surface of the housing and defines a valve seat and has an inner surface defining a valve aperture. The poppet valve is positioned in the downstream portion of the passage of the housing. The poppet valve includes a valve head and a stem extending from the valve head towards the outlet port of the housing. The valve head engages the valve seat of the flange and is moveable between a closed position to a fully open position. The valve head is resiliently biased in the closed position against the valve seat to inhibit fluid flow in a first direction and allow fluid flow in an opposite direction to the first direction. The guide is removeably mounted within the housing. The guide guides the stem of the poppet valve as the poppet valve moves between the closed position and the fully open position. The retainer ring includes an outer edge portion and a center portion. The outer edge portion of the retainer ring engages the inner periphery surface of the housing. The center portion of the retainer ring is configured to receive and retain the guide.

In another aspect, the retainer ring may be a spring clip.

Additional features and benefits will become apparent from the following drawings and descriptions of the invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the end of the specification. The foregoing and other objects, features, and advantages of the invention are apparent from the following detailed description taken in conjunction with the accompanying drawings in which:

DETAILED DESCRIPTION OF EMBODIMENTS OF THE INVENTION

Figure 1:
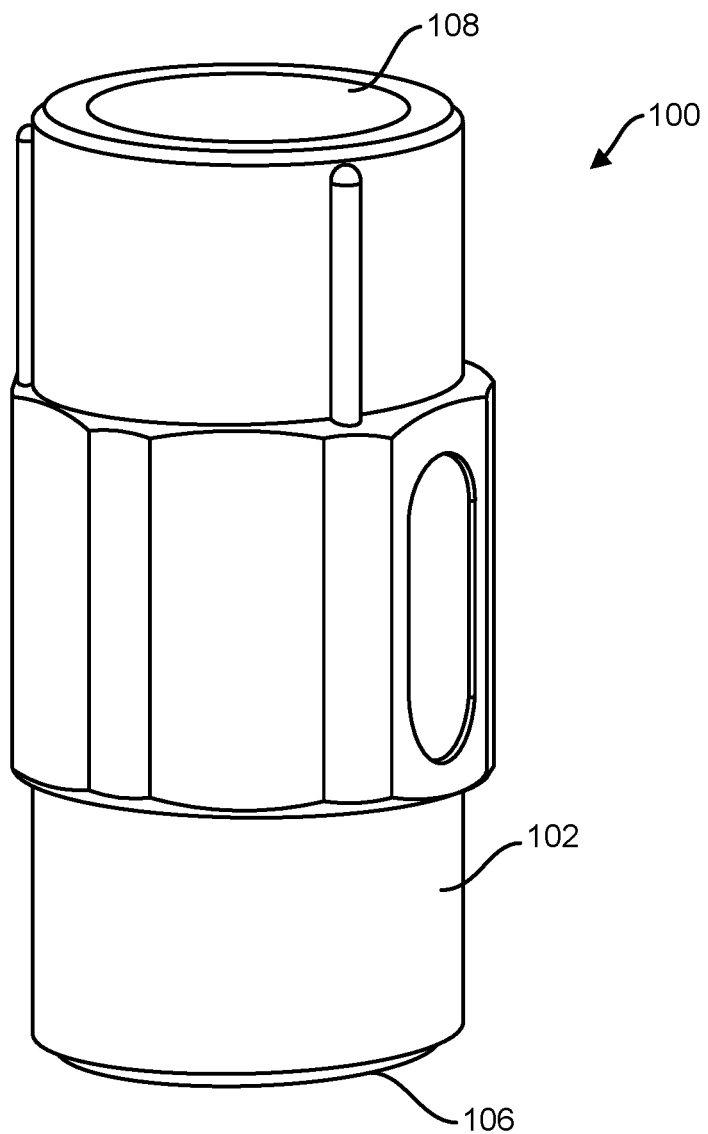
FIG. 1 depicts a prospective view of one embodiment of a check valve constructed in accordance with one or more principles of the present invention.
Figure 2:
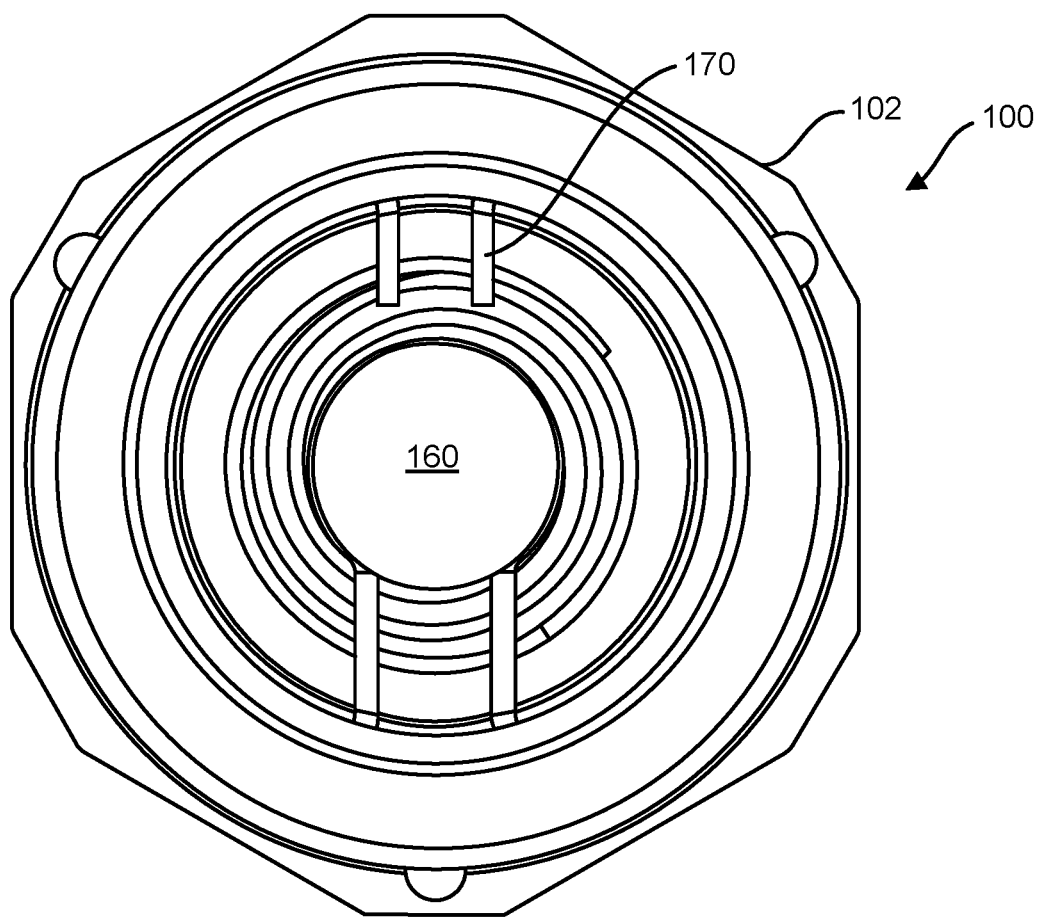
FIG. 2 depicts a top view of the check valve illustrated in FIG. 1 constructed in accordance with one or more principles of the present invention.
Figure 3:
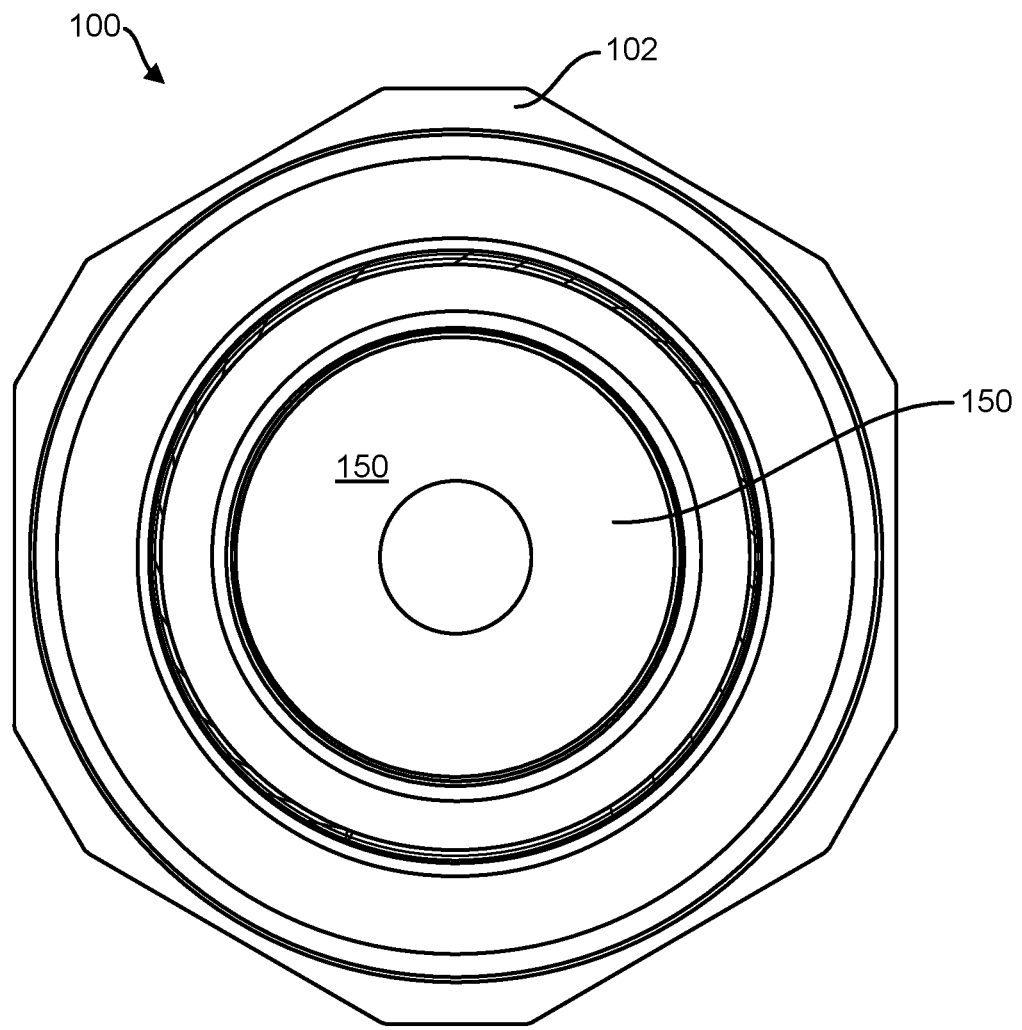
FIG. 3 depicts a bottom view of the check valve illustrated in FIG. 1 constructed in accordance with one or more principles of the present invention.

For the purposes of promoting an understanding of the principles of a valve designed and constructed in accordance with one or more aspects of the present invention, reference will now be made to the embodiments, or examples, illustrated in the drawings and specific language will be used to describe these. It will nevertheless be understood that no limitation of the scope of the invention is thereby intended. Any alterations and further modifications in the described embodiments, and any further applications of the principles of the invention as described herein are contemplated as would normally occur to one skilled in the art to which the check valve invention relates.

Presented herein is an improved valve capable of handling variable fluid flow in either a vertical or horizontal direction. In traditional applications of fluid control valves, the rate of fluid flow was either very high or very low. Thus, a valve disk would always need to be positioned either in the maximum open position or the fully closed position to operate properly. However, more recently, variable frequency drives have been used to control a pump resulting in a variable rate of fluid flow. Typically, a variable frequency Drive (VFD) controlled pump will regulate between 30 Hz to 60 Hz, which results in fifty percent (50%) drop in both Hz and flow rate. The total dynamic head (feet and head) will drop by square and the water horsepower will drop by cube, which is why VFD compatible check valves are important. The variable rate of fluid flow may cause a valve to be disposed at a distance between the maximum open position and the closed position. However, traditional valves do not function properly when used in connection with these variable frequency drive pumps because the pressure exerted against the valve disk is insufficient to displace it to the maximum open position.

Conventional check valves include a valve disk in a downstream portion of a valve connected to a stem extending through a valve aperture and into an upstream portion of the valve. These check valves also include a rubber disk that cooperates with a valve seat forming the valve aperture. The rubber disk seals with the valve seat to prevent leakage of fluid when the valve is in the closed position. This rubber seal is positioned between a valve disk and a valve stem and held tightly by a fastener connecting the valve disk to the valve stem. An example of a valve having this configuration is described in more detail in U.S. Pat. No. 6,581,633 to Andersson, which is hereby incorporated herein by reference. However, assembly and/or repair of these valves are difficult because the valve disk and the valve stem are located on opposite sides of the valve seat or flange formed within the valves.

Alternative check valve designs include a valve disk in a downstream portion of a valve connected to a stem or shaft extending away from, and not through, a valve aperture and into a downstream portion of the valve. The valve head or disk is biased, by a spring, against a valve seat forming the valve aperture. The valve disk seals with the valve seat to prevent leakage of fluid when the valve is in the closed position. The stem or shaft is telescopically received by a guide rigidly mounted on the inner surface of the valve housing in the downstream portion. The guide telescopically receives the stem or shaft as the poppet valve moves between an open and closed position relative to the valve seat. The guide includes an internal bushing in contact with the stem. A bushing is used to reduce wear on the guide and stem. An example of a valve having this configuration is described in more detail in U.S. Pat. No. 9,032,992 to Andersson, which is hereby incorporated herein by reference. However, the guide bushing used in these designs causes friction loss and results in reduced flow areas. Also, the rigid attachment of the guide to the inner surface of the valve housing causes vibration as the poppet valve moves between an open and closed position because the guide is incapable of floating or handling the movement and moments applied to the poppet valve during variable flow conditions. Further, assembly of these valves requires more parts and time. The use of a valve stem in conventional check valves also includes smaller diameter shafts that fail to provide the necessary support or guiding surface to react to the changes in hydraulic pressure incurred during abrupt changes in frequency and changes in rpms of pumps used in a hydraulic system. Since the guiding surface of conventional valve stems experience significant action when used in frequency drives, the valve tends to wear out and become unstable during operation. Current check valve designs are compromised due to the complexity of installation of internal parts, high hydraulic flow losses and restrictions on high temperature applications.

FIGS. 1-5B depict one embodiment of a valve 100 constructed in in accordance with one or more aspects of the present invention. As illustrated, valve 100 includes a tubular housing 102, a poppet valve 150 and a guide 160. Housing 102 defines a passage 104 having an inlet port 106 and an outlet port 108. Valve 100 includes an upstream portion 110, generally between inlet port 106 and flange 120, and a downstream portion 112, generally between outlet port 108 and flange 120. Fluid enters inlet port 106, which is upstream from flange 120 and flows towards outlet port 108, which is downstream from poppet valve 150.

Figure 5A:
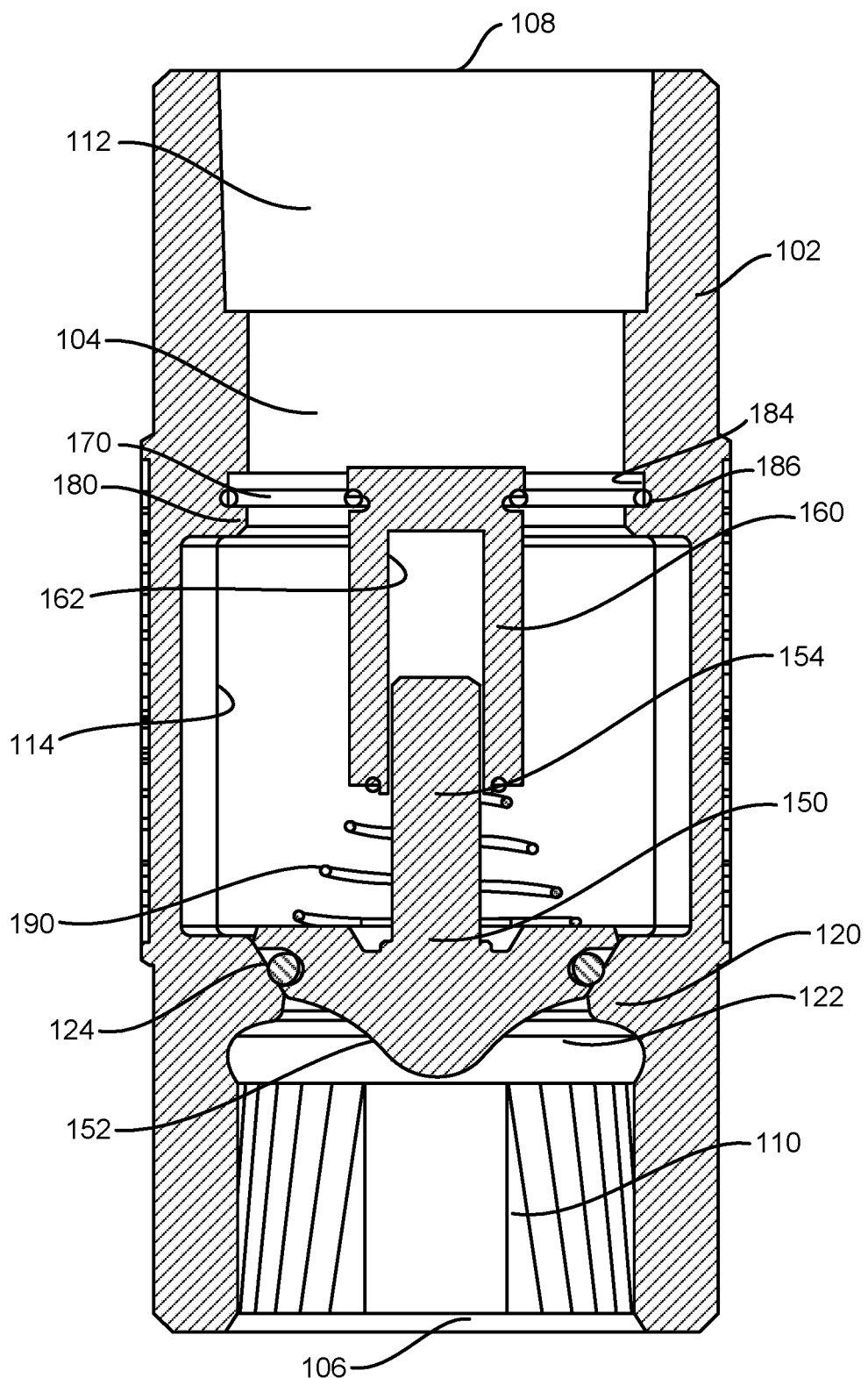
FIG. 5A depicts a cross-sectional view of the check valve illustrated in FIG. 1 in a closed position constructed in accordance with one or more principles of the present invention.
Figure 5B:
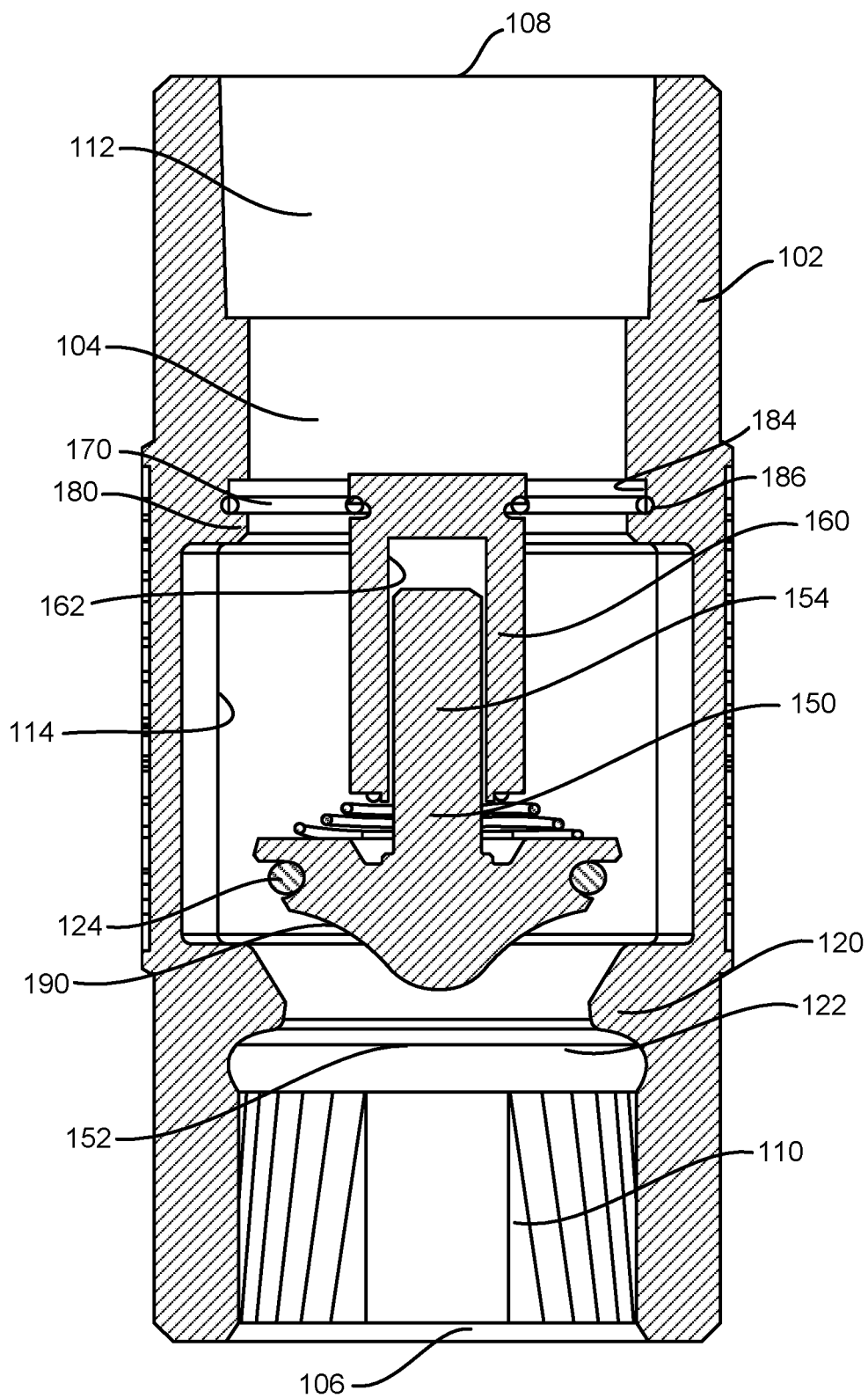
FIG. 5B depicts a cross-sectional view of the check valve illustrated in FIG. 1 in an open position constructed in accordance with one or more principles of the present invention.

As illustrated in FIGS. 5A and 5B, tubular housing 102 includes an inner surface 114 extending from inlet port 106 to outlet port 108. Within tubular housing 102, an inwardly extending circumferential flange 120 protruding from inner surface 114 forms a valve aperture 122. Typically, flange 120 is circular in shape as defined by its inner surface forming valve aperture 122. However, valve aperture 122 is not limited to any particular geometrical shape. A valve seat 124 may be generally circular in shape and is formed by, for example, flange 120. In one example, valve seat 124 is angled in forty-five degrees to provide a larger seating surface and allow more seating area for poppet valve 150.

In an alternative embodiments, valve 100 may include a replaceable seat disposed on flange 120. A replaceable seat may be removably affixed to flange 120. In one embodiment, a replaceable seat may be disposed within housing 102 and adjacent flange 120 before poppet valve 150 is disposed within housing 102. Replaceable seat may be removed and an alternative replaceable seat may be placed within housing 102. A replaceable seat may be made, for example, of a material different than material of housing 102 or flange 120. For example, in one embodiment, replaceable seat can be made of rubber.

Figure 6A:
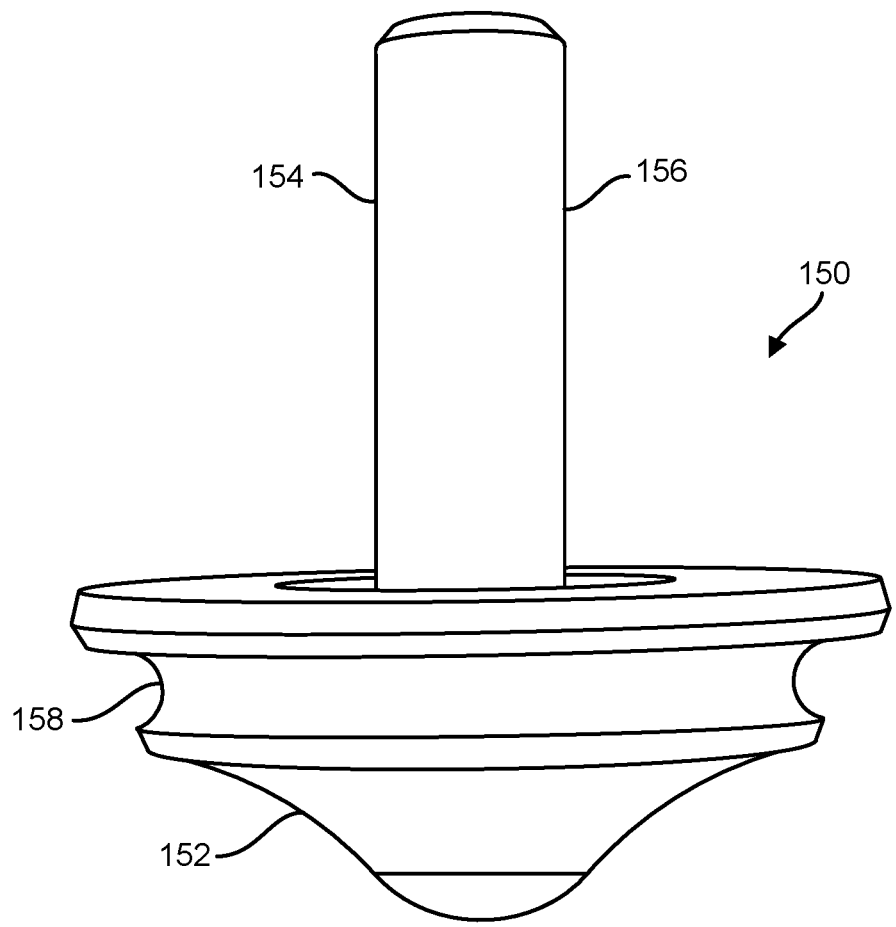
FIG. 6A depicts a side view of one embodiment of a poppet valve constructed in accordance with one or more principles of the present invention.
Figure 6B:
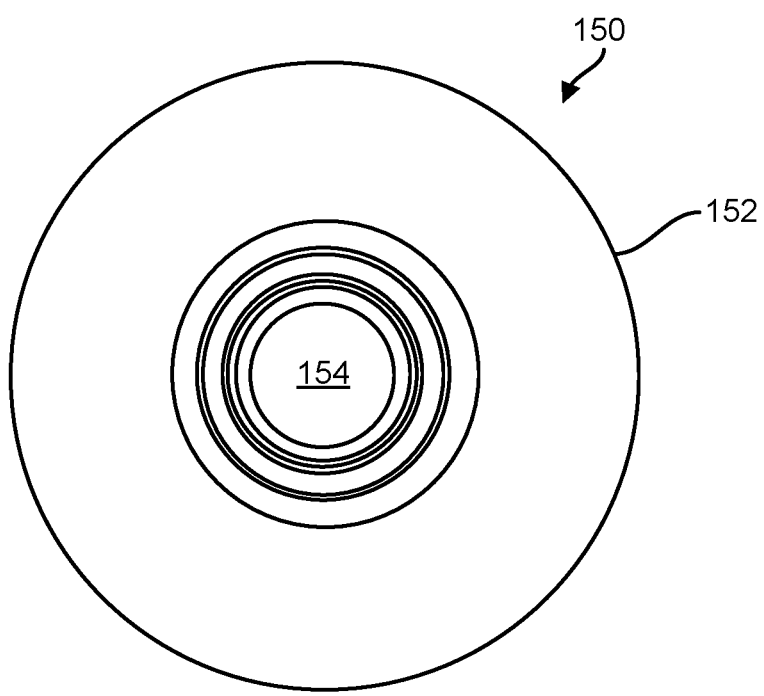
FIG. 6B depicts a top view of the poppet valve illustrated in FIG. 6A constructed in accordance with one or more principles of the present invention.
Figure 6C:
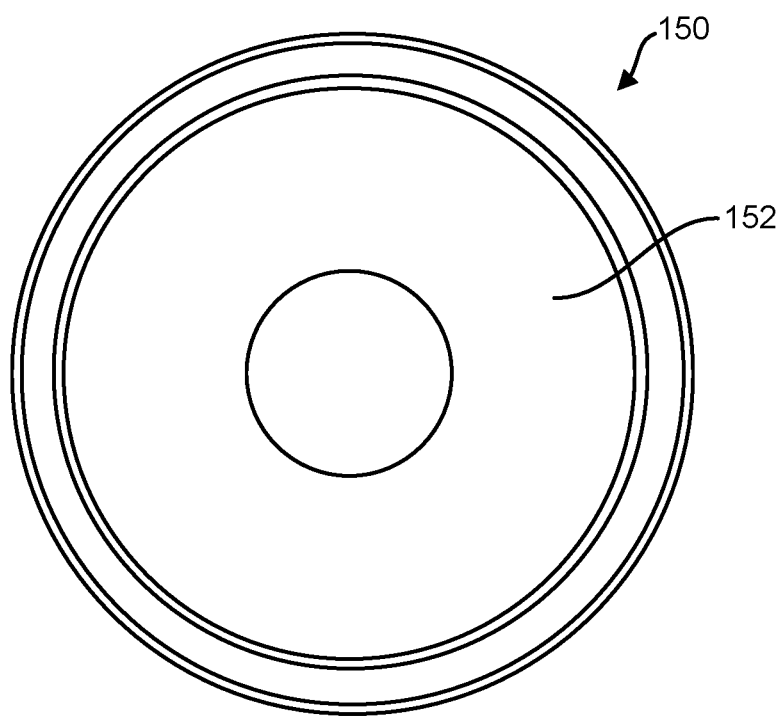
FIG. 6C depicts a top view of the poppet valve illustrated in FIG. 6A constructed in accordance with one or more principles of the present invention.

FIGS. 6A-6C illustrate one example of a poppet valve 150 constructed in accordance with one or more aspects of the invention. As illustrated in FIGS. 5A and 5B, poppet valve 150 is moveably mounted within housing 102 in passage 104 between flange 120 and outlet port 108. Poppet valve 150 includes a valve head or disk 152 and a stem 154 extending from valve head or disk 152 and into downstream portion 112 of tubular housing 102. In one example, the edge of the base of valve disk 152 is annular, having a diameter greater than the diameter of valve seat 124. In another example, the outer surface of valve disk or head 152 facing valve aperture 122 is cone-shaped to provide more laminar flow.

Referring now to FIG. 5A, valve 100 is shown in a closed position with valve head or disk 152 of poppet valve 150 engaging valve seat 124 of flange 120. More specifically, valve head or disk 152 is in contact with flange 120, and a water-tight seal is formed. Fluid cannot pass beyond valve disk 152 when in contact with flange 120. As the force exerted by water pressure on valve disk 152 overcomes the force exerted by a spring 190, shown in FIG. 5B, valve disk 152 is displaced towards outlet port 108 and valve head or disc 152 disengages from valve seat 124 of flange 120 and opens the valve so fluid can flow from upstream portion 110 into downstream portion 112.

Referring now to the illustrative embodiment shown in FIGS. 6A-6C, stem 154 of poppet valve 150 extend from valve disk 152 into the downstream portion 112 of housing 102 of valve 100. Stem 154 may be formed integral with, or affixed to, valve head or disk 152. In one embodiment illustrated in FIGS. 6A-6C, poppet valve 150 may include a single guide leg. Alternative embodiments of poppet valve 150 may include two or more guide legs depending on the radial support desired or required for the smooth operation of the valve. Contrary to conventional check valves, stem 154 extends away from valve seat 124 and does not extend through valve aperture 122. In one example, valve head or disk 152 may include a circumferential groove 158 for retaining a rubber ring or O-ring 195. When valve 100 is in the closed position as illustrated in FIG. 5A, O-ring 195 contacts valve seat 124 to assist in forming a water tight seal to prevent fluid from passing from upstream portion 106 into downstream portion 112.

Figure 7A:
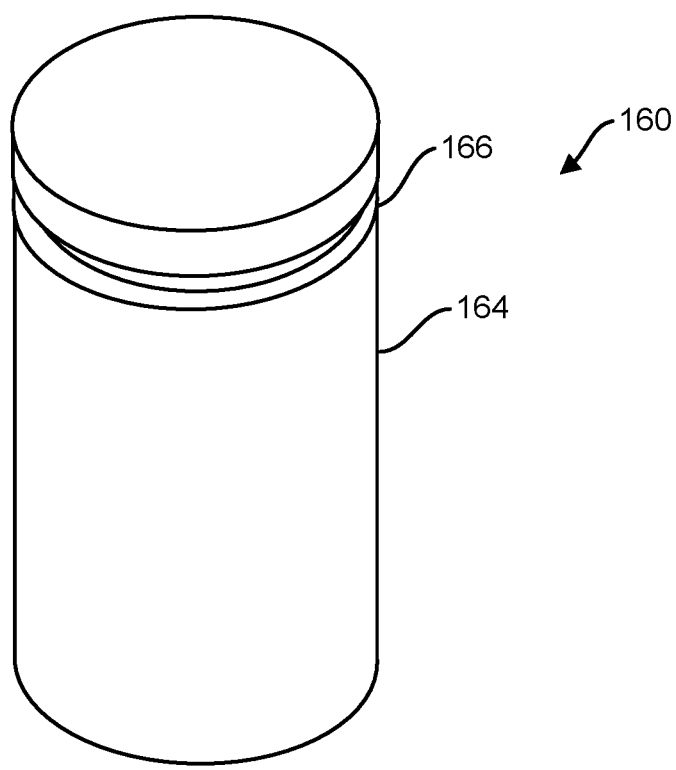
FIG. 7A depicts a perspective view of one embodiment of a guide constructed in accordance with one or more principles of the present invention
Figure 7B:
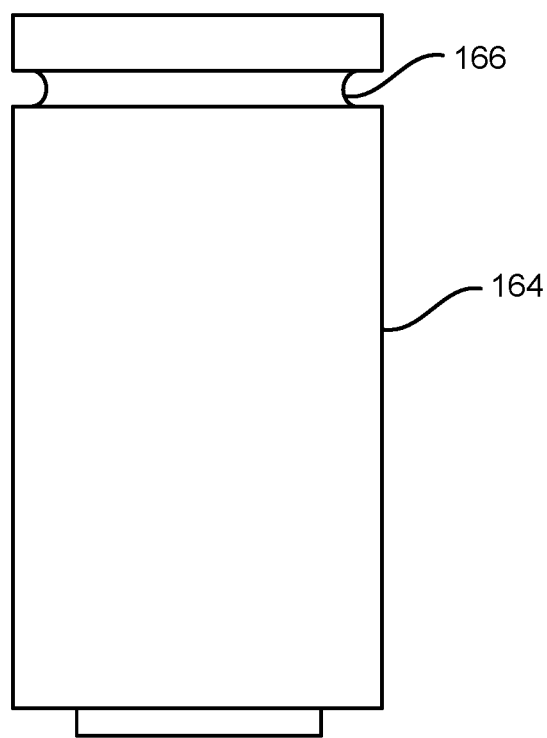
FIG. 7B depicts a side view of the guide illustrated in FIG. 7A constructed in accordance with one or more principles of the present invention.
Figure 7C:
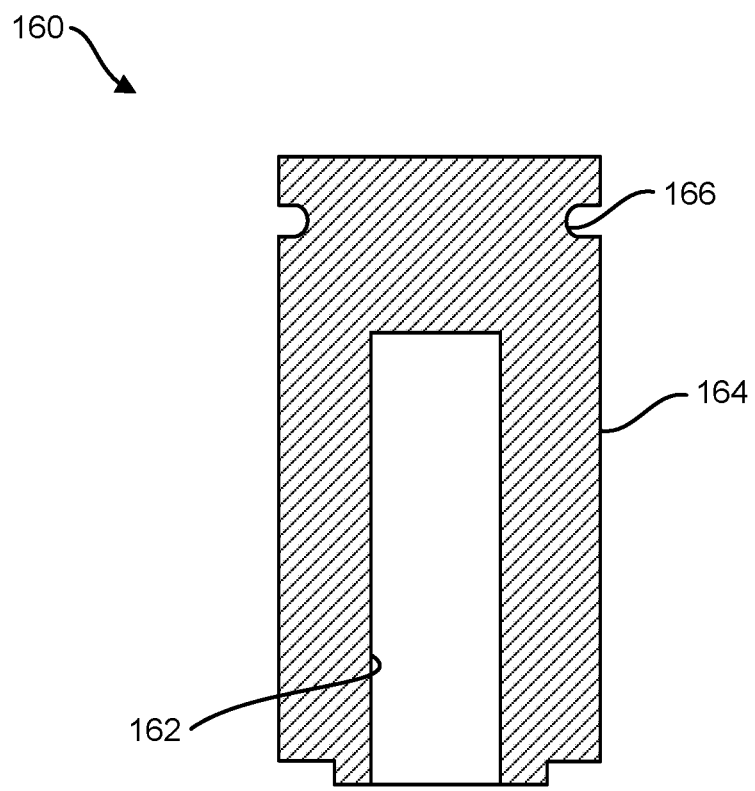
FIG. 7C depicts a cross-sectional view of the guide illustrated in FIG. 7A constructed in accordance with one or more principles of the present invention.

In one embodiment illustrated in FIGS. 5A and 5B, stem 154 of poppet valve 150 is telescopically received by guide 160. One example of a guide 160 constructed in accordance with one or more aspects of the present invention is shown in FIGS. 7A-7C. Guide 160 aids in guiding the reciprocating movement of poppet valve 150 within housing 102 during opening and closing of valve 100. As valve disk 152 moves towards and away from valve seat 124, stem 154 cooperates with the inner surface 162 of guide 160 to maintain valve disk 152 substantially in alignment with valve seat 124. For example, stem 154 includes an outer surface 156 that faces inner surface 162 of guide 160. As poppet 150 moves between an open and closed position, the outer surface 156 of the stem 154 is guided by the inner surface 162 of guide 160.

In contrast to existing valves that include, for example, a valve stem or shaft extending from a valve head through a valve aperture, stem 154 and guide 160 result in less friction loss and provide a larger flow area when valve 100 is in an open position. The use of a stem 154 instead of, for example, a valve stem or shaft and guide bushing, provides quicker movement of poppet valve 100 which lowers hydraulic shock from water hammer surges during pump shut-down or power failure.

Figure 8A:
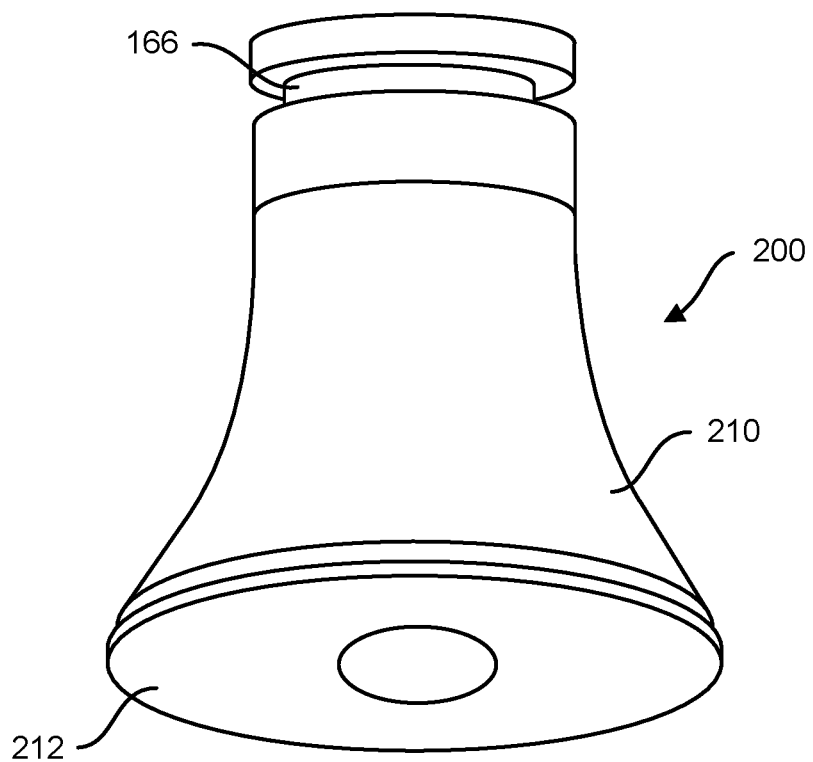
FIG. 8A depicts a depicts a perspective view of an alternative embodiment of a guide constructed in accordance with one or more principles of the present invention
Figure 8B:
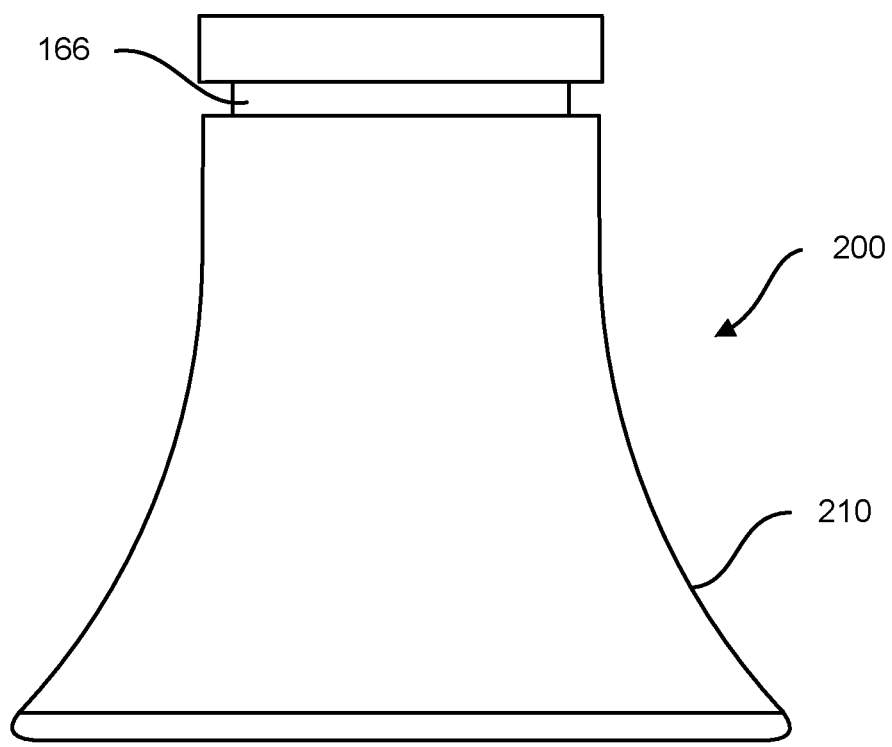
FIG. 8B depicts a side view of the guide illustrated in FIG. 8A constructed in accordance with one or more principles of the present invention.
Figure 8C:
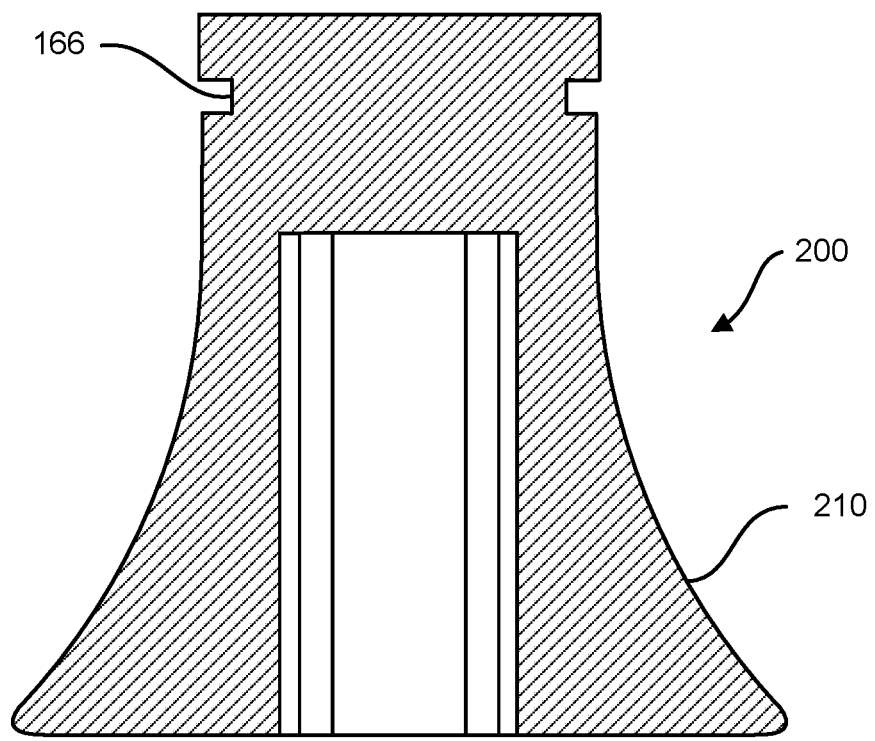
FIG. 8C depicts a cross-sectional view of the guide illustrated in FIG. 8A constructed in accordance with one or more principles of the present invention.
Figure 9:
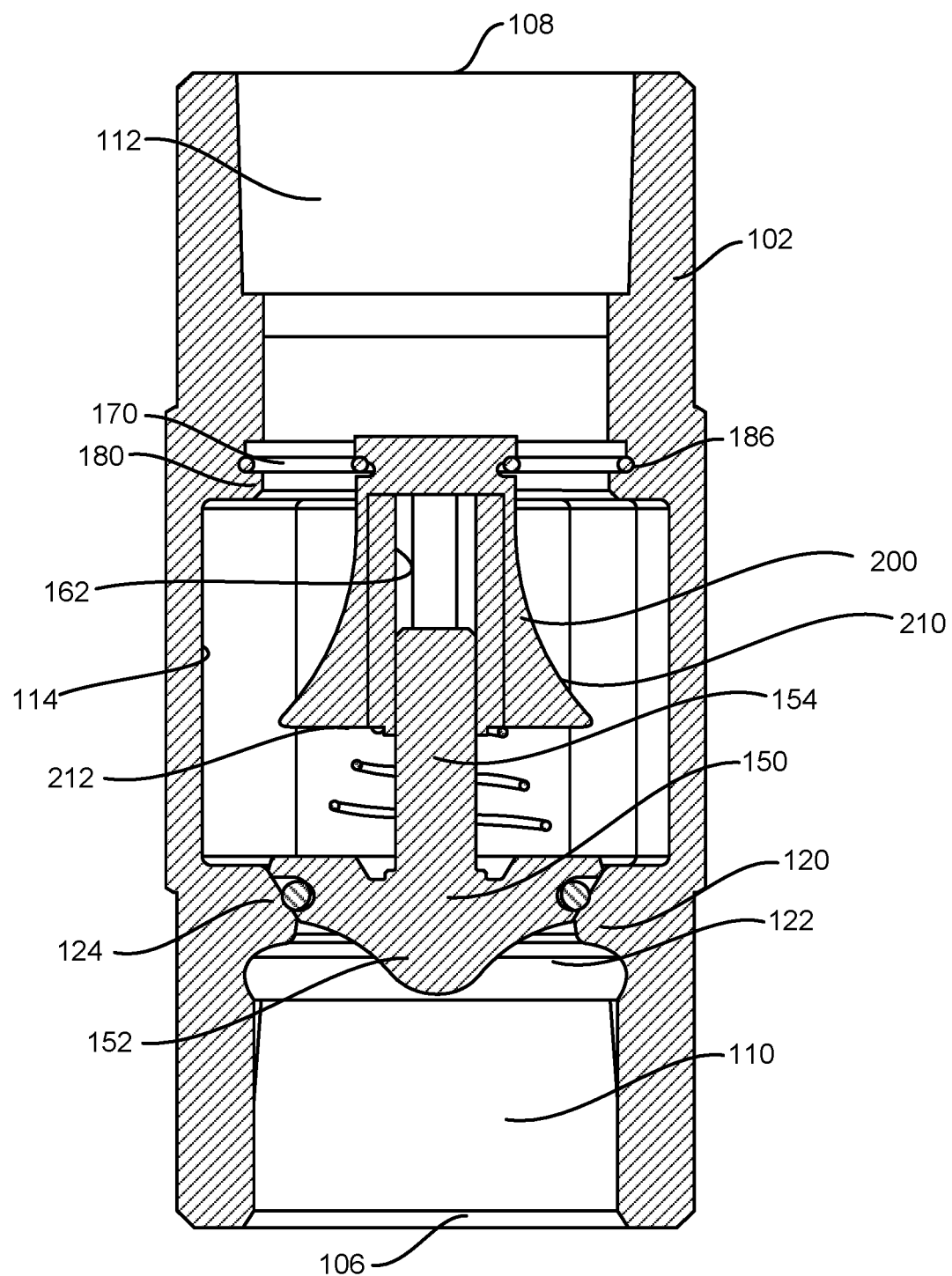
FIG. 9 depicts a cross-sectional view of one embodiment of a check valve in a closed position including the guide illustrated in FIGS. 8A-8C constructed in accordance with one or more principles of the present invention

FIGS. 8A-8C illustrate an alternate embodiment of a guide 200 constructed in accordance with one or more aspects of the present invention. In this example, guide 200 may be equipped with a skirt or bell shaped lower portion 210 designed to support valve head or disk 152 in the fully opened position and also prevent vortex forces from working on the backside of valve head 152. Guide 200 having a skirt or shaped lower portion 210 limits cavitation and provides improved stability with lower friction losses and more stable operation as valve head 152 moves between an open position and a closed position, especially during high flow velocities. In this embodiment, valve disk 152 may be prevented from moving further into downstream portion by end surface 212 of skirt-shaped lower portion 210 of guide 200. As illustrated in FIG. 9, the diameter of end surface 212 of skirt-shaped lower portion 210 of guide 200 may be equal to or substantially similar to the outer diameter of the portion of valve head or disk 152 facing end surface 212. In one example, end surface 212 of skirt or bell shaped lower portion 210 of guide 200 will make the capturing of spring 190 during open more positive as it "nests-up" and not "coil-up."

Figure 10A:
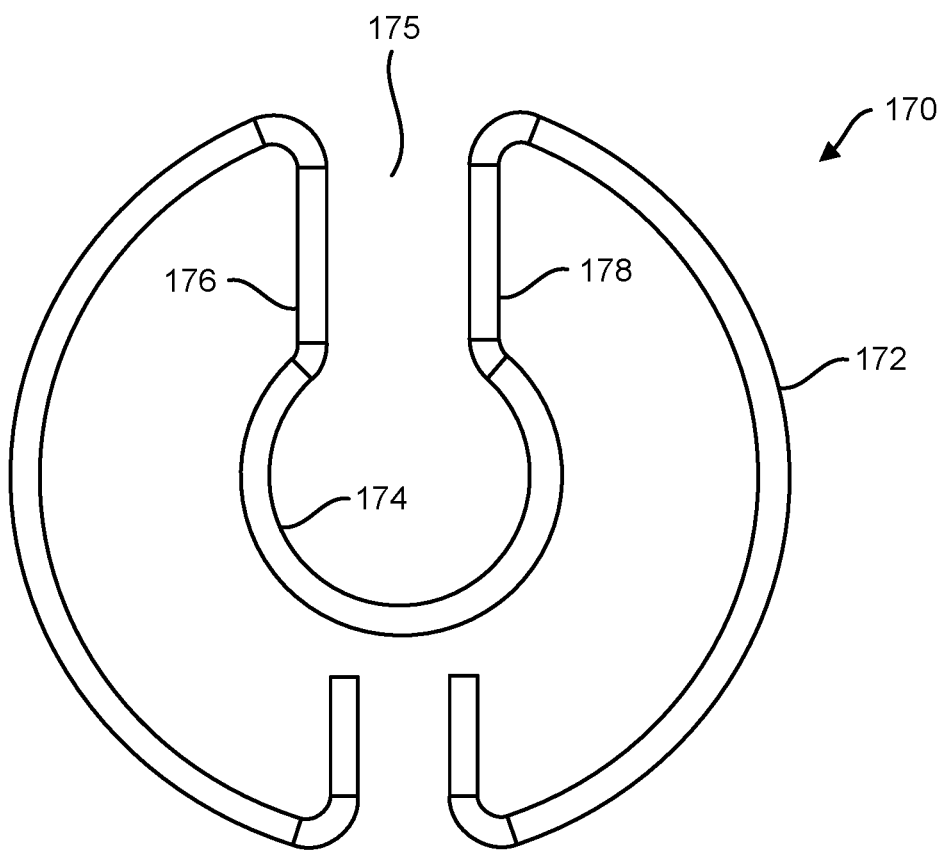
FIG. 10A depicts a top view of one embodiment of a retainer ring constructed in accordance with one or more principles of the present invention.

As illustrated in FIGS. 5A, 5B and 9, guide 160 or 200 is removeably mounted to inner surface 114 of housing 102 in upstream portion 112 of valve 100. In one embodiment, guide 160 or 200 may be secured or locked in place in downstream portion 112 of valve 100 by, for example, a retainer ring. In one example, retainer ring is a spring clip 170. Spring clip 170 may be formed from extruded plastic or metal or die cast. Spring clip 170 is a fastener that grips guide 160 or 200 through spring tension. As illustrated in FIGS. 10A-11, spring clip 170 is flat and extends transverse or perpendicular to the longitudinal axis of the passageway extending through valve 100.

The use of spring clip 170 with guide 160 or 200 and poppet 150 constructed in accordance with one or more aspects of the present invention serves multiple purposes. For example, spring clip 170 holds or retains guide 160 or 200 within valve 100. Also, a spring loaded center guide 160 or 200 self-centers poppet 150 travel moments during valve operation by positioning guide 160 or 200 and poppet 150 assembly within the flow stream and respond to a variable flow. This configuration stabilizes poppet 150 in the flow stream during variable flow conditions. Unlike past attempts which include guides having rigid supports integrally formed with and extending outwardly and upwardly towards the interior valve housing wall (see U.S. Pat. No. 9,032,992), the use of spring clip 170 allows guide 160 or 200 and poppet 150 to float and aids in centering them during flow conditions. The use of spring clip 170 also reduces the vibration caused by traditional rigid guides that are not allowed to account for, and do not deflect in response to, variable flow condition.

Figure 10B:
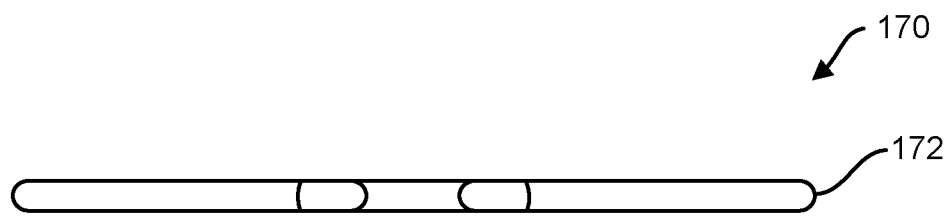
FIG. 10B depicts a side view of the retainer ring illustrated in FIG. 8B constructed in accordance with one or more principles of the present invention.
Figure 11:
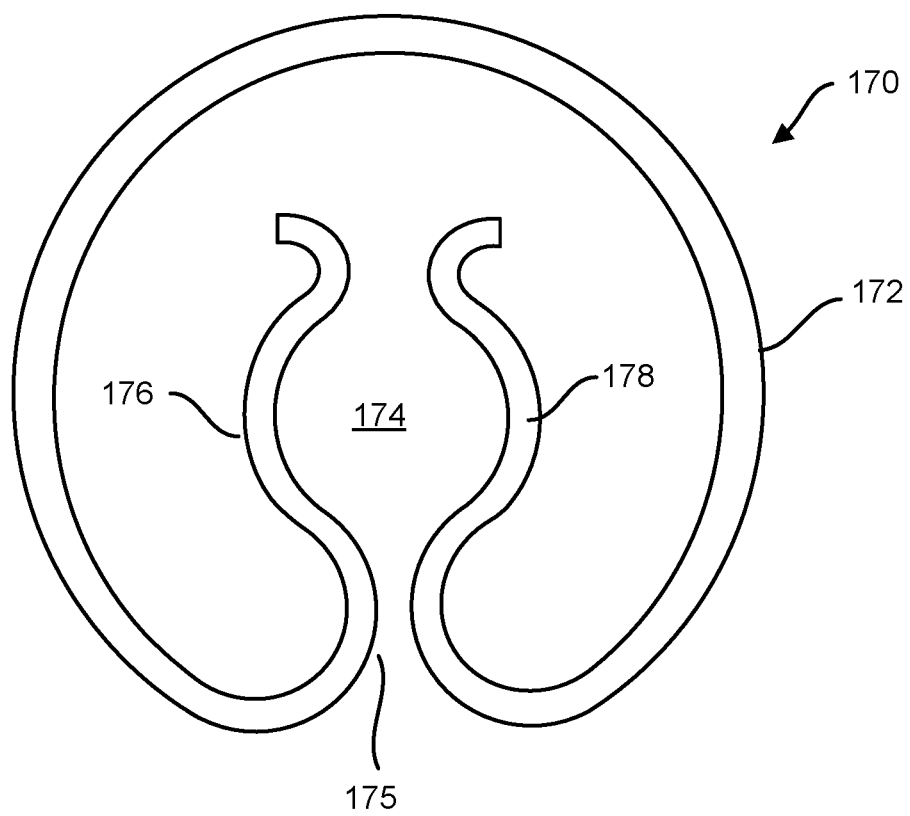
FIG. 11 depicts an alternative embodiment of a retainer ring constructed in accordance with one or more principles of the present invention.

One example of a spring clip 170 constructed in accordance with one or more aspects of the present invention is illustrated in FIGS. 10A and 10B. Spring clip 170 is configured to engage with inner surface 114 of housing 102 and outer surface 164 of guide 160 to securely retain guide 160 and poppet 150 within passage 104 during operation of valve 100. In one embodiment, spring clip 170 is substantially flat and extends between inner surface 114 of housing 102 and outer surface 164 of guide 160 traverse or perpendicular to the longitudinal axis of passage 104 of valve 100. Spring clip may be constructed from, for example, a non-corrosive metal or plastic.

In the example illustrated in FIGS. 10A and 10B, spring clip 170 may include an outer edge portion 172 and a center portion 174. Outer edge portion 172 may be received by or retained within, for example, an annular space, slot or groove formed in inner surface 114 of housing 102. Outer edge portion 172 may be slipped into or forced radially into the annular groove formed in inner surface 114. In one example illustrated in FIGS. 5A and 5B, inner surface 114 of housing 102 may include a circumferential protrusion 180 that include an outer surface 184 and an annular or circumferential slot or groove 186 formed in outer surface 184. In one example, the outer diameter of the entire periphery of outer edge portion 172 of spring clip 170 is larger than the diameter of outer surface 184 such that, when installed within passage 104, outer edge portion 172 of spring clip 170 snaps into place and is retained in slot or groove 186.

Central portion 174 of spring clip 170 may be formed and shaped to receive and retain guide 160 along the longitudinal axis of valve 100. In one example illustrated in FIG. 10A, central portion 174 includes resilient fingers or arms 176 and 178 that extend inwardly from outer edge portion 172. Together, the ends of resilient arms 176 and 178 may be joined together and shaped in the form of a "U" to receive and hold guide 160 using spring tension from resilient arms 176 and 178. In an alternative configuration illustrated in FIG. 11, resilient arms 176 and 178 may not be connected together. In one embodiment, outer surface 164 of guide 160 includes a circumferential space, slot or groove 166 to receive and retain resilient arms 176 and 178. In this example, outer edge portion 172 includes an open end 175 for slidably receiving and resiliently holding using spring tension guide 160 into position between resilient arms 176 and 178. Resilient arms 176 and 178 may be flexible and moveable outwardly to receive outer surface 164 of guide 160 and then snap into place within space, slot or groove 166 and prevent guide 160 from moving during operation of valve 100. Resilient arms 176 and 178 are configured to apply an active retaining force against outer surface 164 of guide 160 within annular space, slot or groove 166.

Spring clip 170 may be constructed in alternative configurations that allow it to receive and retain guide 160 along the longitudinal axis of valve 100 and be removeably retained by the inner surface of housing 102. For example, outer edge portion 172 does not have to include an open end 175 for receiving guide 160, but rather the resilient arms may extend inward from outer edge portion 172.

Figure 4:
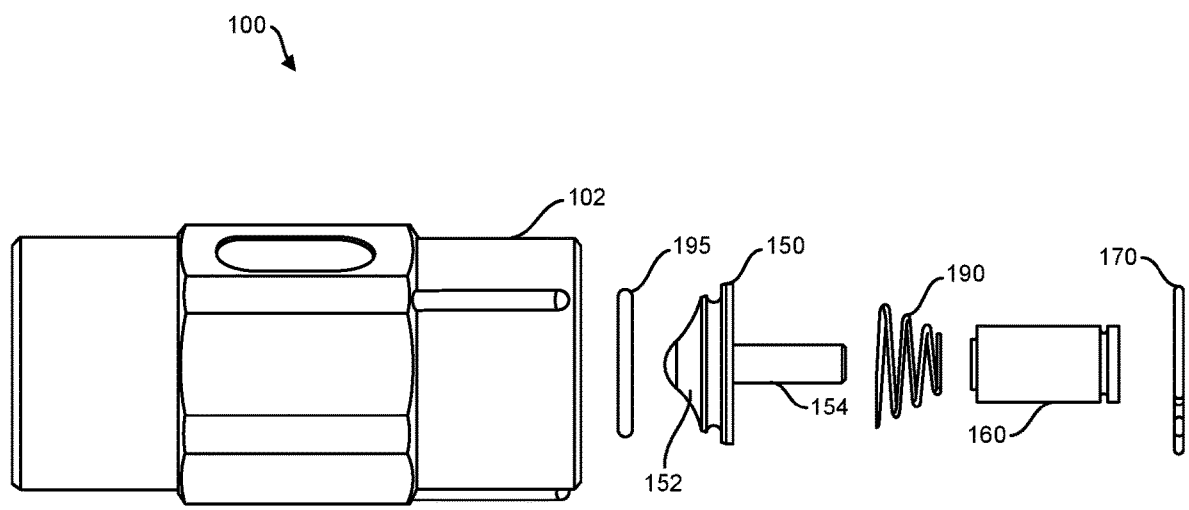
FIG. 4 depicts an exploded view of the check valve illustrated in FIG. 1 constructed in accordance with one or more principles of the present invention.

Referring to the illustrative embodiments of FIGS. 4, 5A and 5B, an elastomeric spring means such as, for example, a stainless steel coil spring 190, biases valve disk in the closed position against valve seat. Spring is telescoped over the outer diameter of guide 160. A first end of spring 190 is supported or, alternatively, anchored against guide 160. Opposite end of spring 160 is supported or, alternatively, anchored against valve disk. In each of the embodiments listed above, the diameter of spring 190 is larger than the outside diameter of the stem of poppet valve 150. A spring 190 having a larger diameter spreads the force of the spring about a large area of valve disk, resulting in a more stable resistance to the pressure of fluid against valve disk.

Valve 100 operates in the usual manner of a check valve to provide an opening in the valve when the pressure in upstream portion of valve housing 102 is sufficient to overcome the force imposed on valve disk by spring means and to be closed by action of spring means when the pressure upstream of the valve is decreased. In one embodiment, valve 100 may include a valve head stop disposed in the housing. When the valve is fully open and when the flow velocities and the hydraulic forces are the highest on valve disc, valve disc is fully supported on the peripheral back edge by valve head stop. Valve head stop contacts valve head in the fully open position and prevents valve head from moving further into downstream portion. Also, poppet 150, as it travels in guide 160 or 200, is restricted to provide full support on end surface 212 of guide 160 or 210 when fully open and during maximum flow efficiency. At this time, poppet 150 and guide 160/200 will have a near prop-shaped cross section providing a stable operation and lower friction losses than conventional check valves of this type.

A valve 100 constructed in accordance with one or more aspects of the present invention is easily assembled. For example, spring clip 170 is installed on guide 160 by sliding guide 160 through open end 175 of spring clip 170 until resilient arms 176 and 178 are securely positioned within space, slot or groove 166 in outer surface 164 of guide 160. Next, spring 190 is positioned over stem 154 of poppet 150. Then, stem 154 is inserted into guide 160, and this assembly is inserted through outlet port 108 until outer edge portion of spring clip 170 engages space, slot or groove 186 in inner surface 114 of housing 102. In this configuration, spring 190 will bias valve disk 152 of poppet 150 in a closed position against valve seat 124. As assembled and in use, poppet 150 is dual spring loaded. For example, a quick acting spring 190 acts on the opening and closing of poppet 150 while spring clip 170 also acts to stabilize movement of poppet 150 in the flow velocity during both high and low flow conditions that a typical fixed centralized rigidly mounted poppet guide cannot accomplish.

While embodiments of the invention have been illustrated and described in detail in the disclosure, the disclosure is to be considered as illustrative and not restrictive in character. All changes and modifications that come within the spirit of the invention are to be considered within the scope of the disclosure.

The invention claimed is:

1. A valve, said valve comprising:
    a housing including an inner periphery surface defining a passage therethrough between an inlet port and an outlet port;
    a flange within said housing dividing the passage between the inlet port and outlet port into an upstream portion and a downstream portion, said flange extending circumferentially around the inner periphery surface of said housing, the flange defining a valve seat and having an inner surface defining a valve aperture;
    a poppet valve positioned in the downstream portion of the passage of said housing, said poppet valve including a valve head and a stem extending from the valve head towards the outlet port of said housing, the valve head engaging the valve seat of said flange and moveable between a closed position to a fully open position, the valve head being resiliently biased in the closed position against the valve seat to inhibit fluid flow in a first direction and allow fluid flow in an opposite direction to the first direction; and
    a guide removeably mounted within said housing, said guide guiding the stem of said poppet valve as said poppet valve moves between the closed position and the fully open position; and
    a resilient retainer ring, said retainer ring including an outer edge portion and a center portion, the outer edge portion engaging the inner periphery surface of said housing, the center portion configured to receive and removeably couple said guide.

2. The valve of claim 1, wherein said retainer ring is a spring clip.

3. The valve of claim 1 further comprising spring means for biasing said poppet valve towards a closed position.

4. The valve of claim 1, wherein said guide telescopically receives the stem of said poppet valve as said poppet valve moves between the closed position and the fully open position.

5. The valve of claim 1, wherein the guide includes a bottom edge, wherein the valve head contacts the bottom edge of the guide in the fully opened position.

6. The valve of claim 1, wherein the valve head is resiliently biased in the closed position against the valve seat by a spring.

7. The valve of claim 1, wherein the guide includes an end surface configured to contact the valve head in the fully open position and to prevent vortex forces on a backside of the valve head.

8. The valve of claim 1, wherein the outer edge portion of said retaining ring is retained within a groove formed in the inner periphery surface of said housing.

9. The valve of claim 8, wherein the center portion of said retaining ring is retained within a groove formed in the outer surface of said guide.

10. The valve of claim 1, wherein the guide includes a bell shaped lower portion, the bell shaped lower portion including an end surface configured to contact the valve head in the fully open position.

11. A valve, said valve comprising:
 a housing including an inner periphery surface defining a passage therethrough between an inlet port and an outlet port;
 a flange within said housing dividing the passage between the inlet port and outlet port into an upstream portion and a downstream portion, said flange extending circumferentially around the inner periphery surface of said housing, the flange defining a valve seat and having an inner surface defining a valve aperture;
 a poppet valve positioned in the downstream portion of the passage of said housing, said poppet valve including a valve head and a stem extending from the valve head towards the outlet port of said housing, the valve head engaging the valve seat of said flange and moveable between a closed position to a fully open position, the valve head being resiliently biased in the closed position against the valve seat to inhibit fluid flow in a first direction and allow fluid flow in an opposite direction to the first direction; and
 a guide removeably mounted within said housing, said guide guiding the stem of said poppet valve as said poppet valve moves between the closed position and the fully open position, said guide including an outer surface, the outer surface of said guide including a circumferential groove; and
 a spring clip, said spring clip including an outer edge portion and a center portion, the outer edge portion retained by a circumferential groove formed in the inner periphery surface of said housing, the center portion of said spring clip engages and retained by the groove in the outer surface of said guide.

12. The valve of claim 11, wherein the center portion of said spring clip is formed by a first arm and a second arm.

13. The valve of claim 12, wherein the first arm and the second arm are connected.

* * * * *